United States Patent
Nagata et al.

(10) Patent No.: US 10,359,757 B2
(45) Date of Patent: Jul. 23, 2019

(54) CONTROL LOGIC DIAGRAM ANALYSIS DEVICE AND CONTROL LOGIC DIAGRAM ANALYSIS METHOD

(71) Applicant: Mitsubishi Electric Corporation, Chiyoda-ku (JP)

(72) Inventors: Tomoyuki Nagata, Tokyo (JP); Koichi Nakagawa, Tokyo (JP); Shinichiro Tsudaka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 54 days.

(21) Appl. No.: 15/571,984

(22) PCT Filed: May 13, 2015

(86) PCT No.: PCT/JP2015/063782
§ 371 (c)(1),
(2) Date: Nov. 6, 2017

(87) PCT Pub. No.: WO2016/181526
PCT Pub. Date: Nov. 17, 2016

(65) Prior Publication Data
US 2018/0143605 A1 May 24, 2018

(51) Int. Cl.
*G05B 19/05* (2006.01)
*G05B 19/042* (2006.01)
(Continued)

(52) U.S. Cl.
CPC .......... *G05B 19/05* (2013.01); *G05B 19/042* (2013.01); *G05B 19/0426* (2013.01);
(Continued)

(58) Field of Classification Search
CPC .......... G06F 9/44; G05B 19/05; G05B 19/042
(Continued)

(56) References Cited

U.S. PATENT DOCUMENTS 4,190,890 A * 2/1980 Marx ............... H01B 13/01227
29/720
8,495,054 B2 7/2013 Tsudaka
(Continued)

FOREIGN PATENT DOCUMENTS

JP  2012-181821 A  9/2012
WO  2017/158926 A1  9/2017

OTHER PUBLICATIONS

Nagata, T., et al., "A Method to Extract Control Logic Components from Control Logic Diagrams using Hierarchized Rules Analysis", Mitsubishi Electric Corporation, Nov. 24, 2015, 5 pages.
(Continued)

*Primary Examiner* — Sun J Lin
(74) *Attorney, Agent, or Firm* — Oblon, McClelland, Maier & Neustadt, L.L.P.

(57) ABSTRACT

A control logic diagram analysis device that efficiently creates a control logic diagram, and a method thereof. The control logic diagram analysis device includes a control logic diagram analysis rule application unit, a control logic diagram template component generation unit, and a control logic diagram project-specific part extraction unit. The control logic diagram analysis rule application unit sequentially applies a control logic diagram analysis rule to the control logic diagram from a lower layer level. The control logic diagram template component generation unit acquires the control logic diagram analysis rule having an agreement section within the control logic diagram. The control logic diagram project-specific part extraction unit extracts an element in the control logic diagram corresponding to the control logic diagram analysis rule having the agreement section within the control logic diagram.

6 Claims, 18 Drawing Sheets

(51) Int. Cl.
  *G06F 9/44* (2018.01)
  *G06K 9/00* (2006.01)
  *G06F 17/50* (2006.01)
  *G06F 16/583* (2019.01)

(52) U.S. Cl.
  CPC ............ *G05B 19/056* (2013.01); *G06F 9/44* (2013.01); *G06K 9/00476* (2013.01); *G06F 16/5854* (2019.01)

(58) Field of Classification Search
  USPC .................................................. 715/101, 104
  See application file for complete search history.

(56) References Cited

U.S. PATENT DOCUMENTS

| | | | | |
|---|---|---|---|---|
| 2015/0177322 A1* | 6/2015 | Yoshinaga et al. | .... | G05B 19/05 714/736 |
| 2017/0277175 A1* | 9/2017 | Yoshida et al. | .... | G05B 23/0243 |

OTHER PUBLICATIONS

Japanese Office Action dated Oct. 17, 2017 in Japanese Application No. 2017-517541 filed Jun. 29, 2017.
International Search Report dated Jul. 21, 2015 in PCT/JP2015/063782 filed May 13, 2015.
Extended European Search Report dated Dec. 11, 2018 in Patent Application No. 15891850.8.
Marko Milosevic, "Hierarchical pattern matching in VLSI", https://mediatum.ub.tum.de/doc/684992/34441.pdf, XP055527600, 2009, 155 pages.

* cited by examiner

F I G. 2
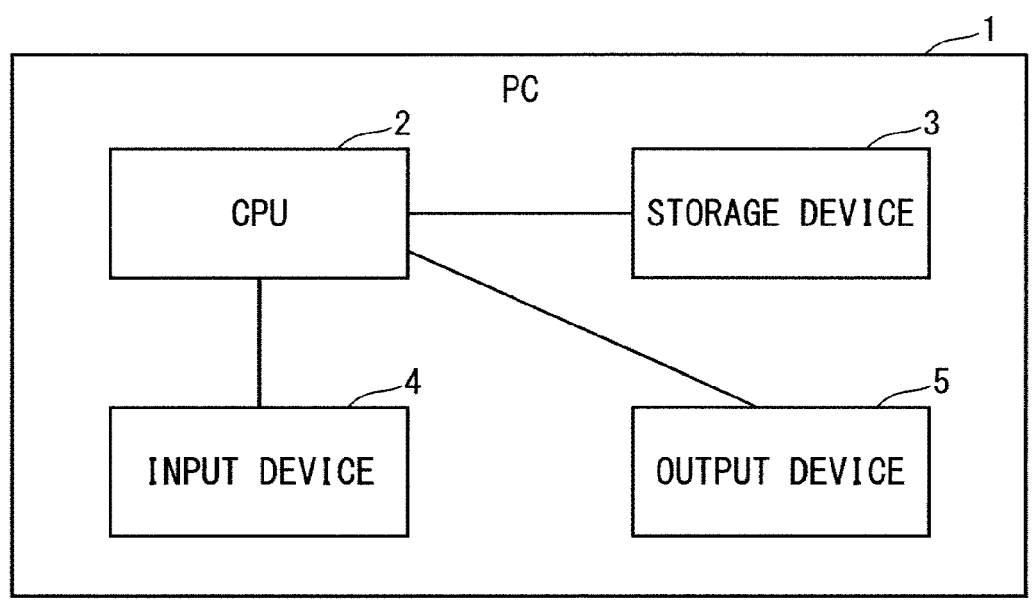

FIG. 5

| ITEM | DESCRIPTION |
|---|---|
| PROJECT ID | A0001 |
| CUSTOMER | B0001 |
| CUSTOMER COUNTRY | JAPAN |
| TARGET PROJECT INSTALLATION COUNTRY | JAPAN |
| TARGET PROJECT NAME | PUMPING STATION C |
| TYPE OF TARGET PROJECT | PUMPING STATION |
| QUANTITY OF WATER TO BE TREATED | 10kL |

FIG. 6
Basic PROCESSING RULE No.1
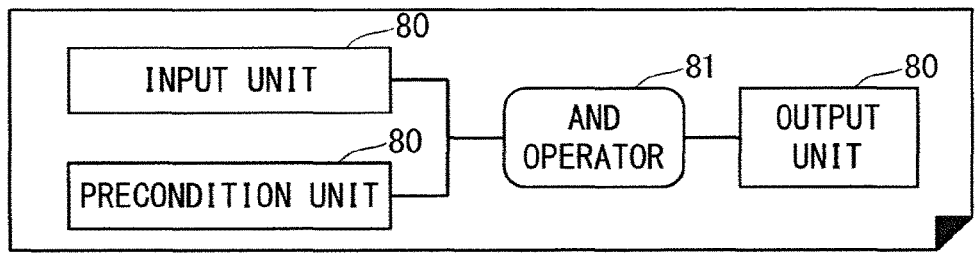
PRECONDITION RULE No.1
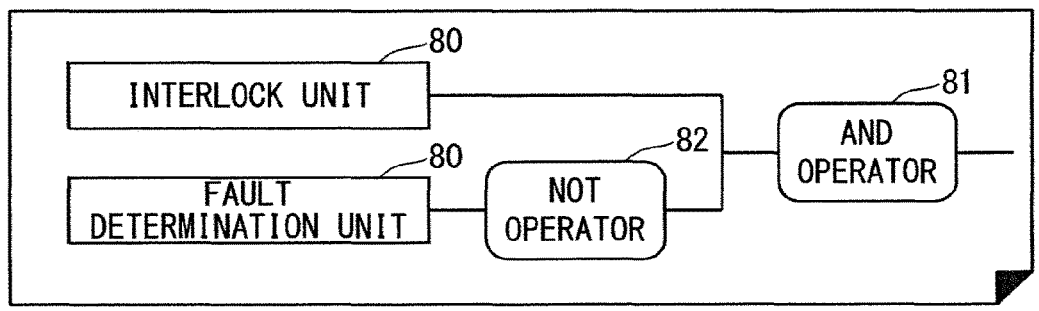
REMOTE MONITORING FUNCTION RULE No.1
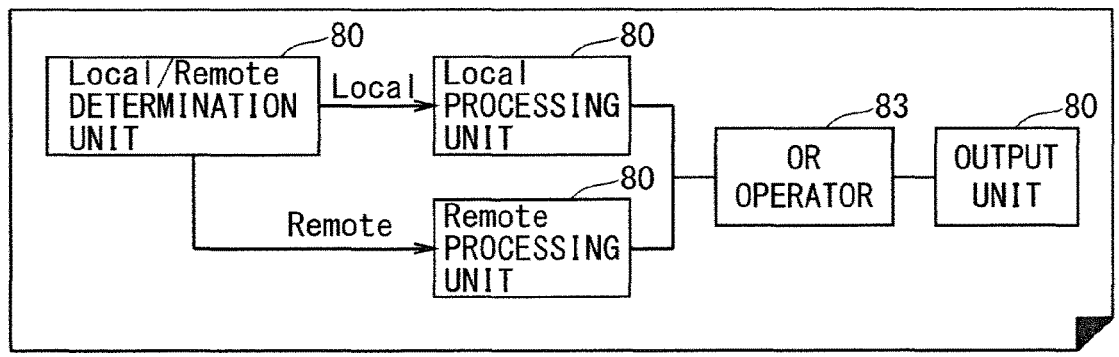

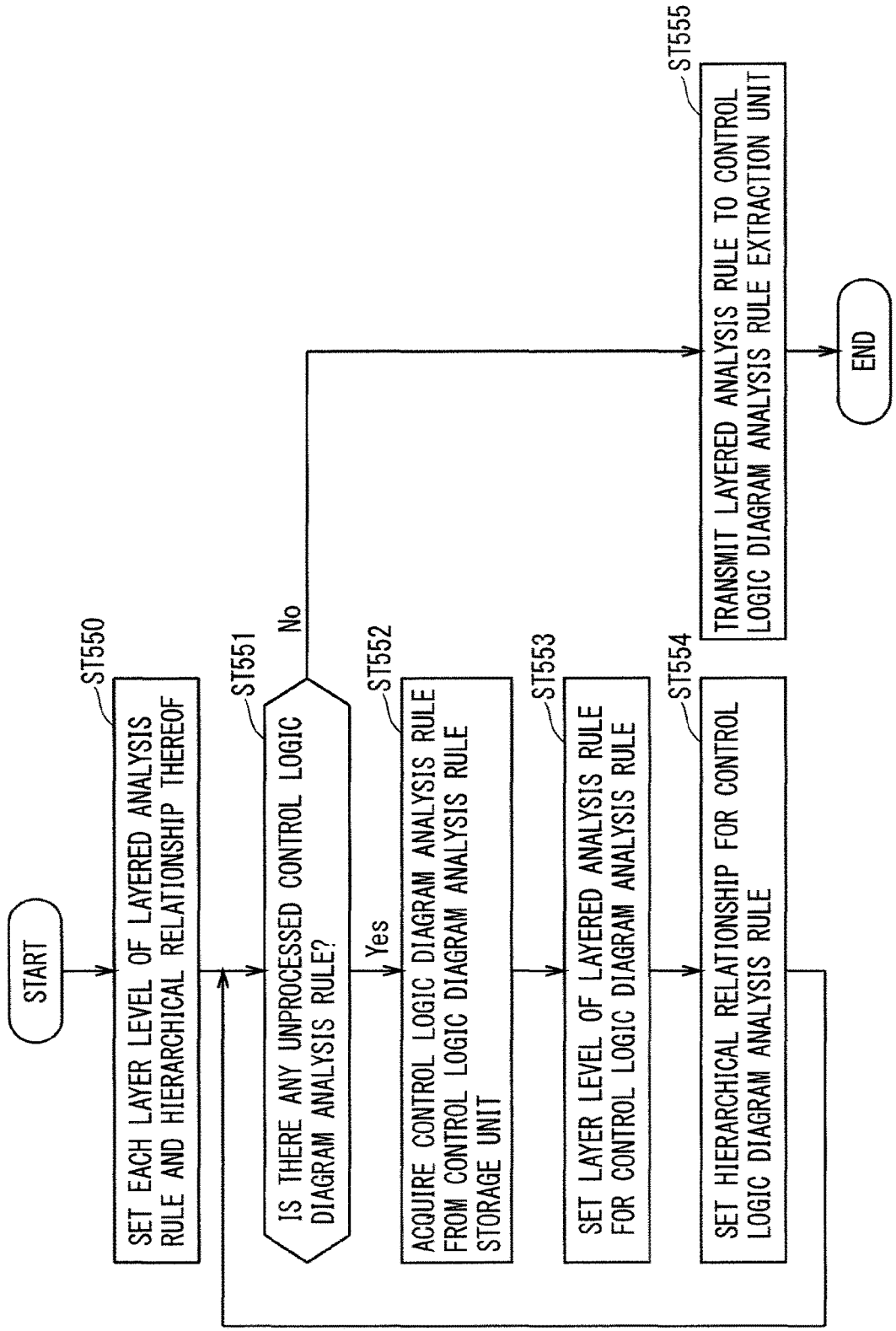

F I G. 1 4
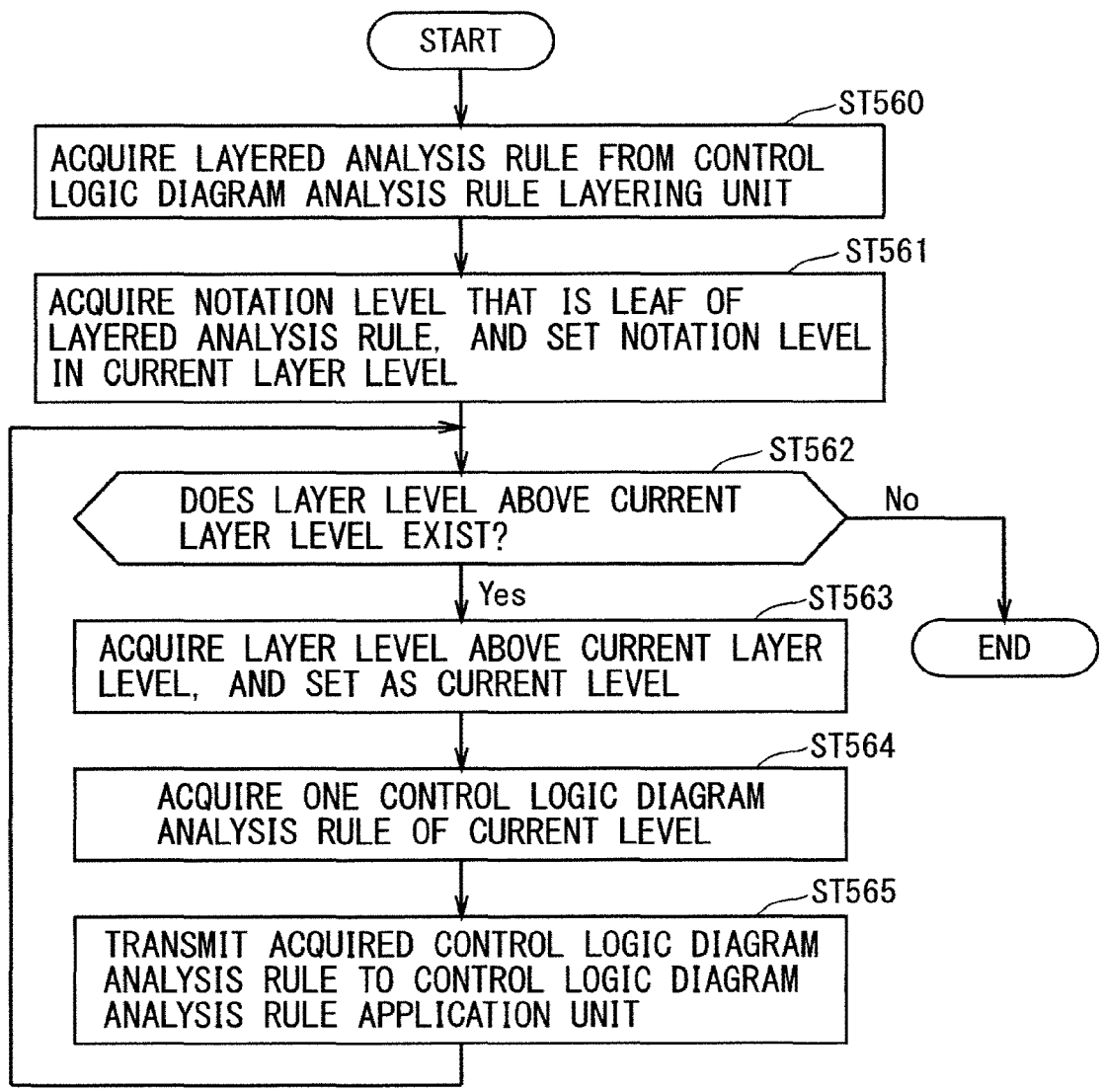

F I G. 1 7
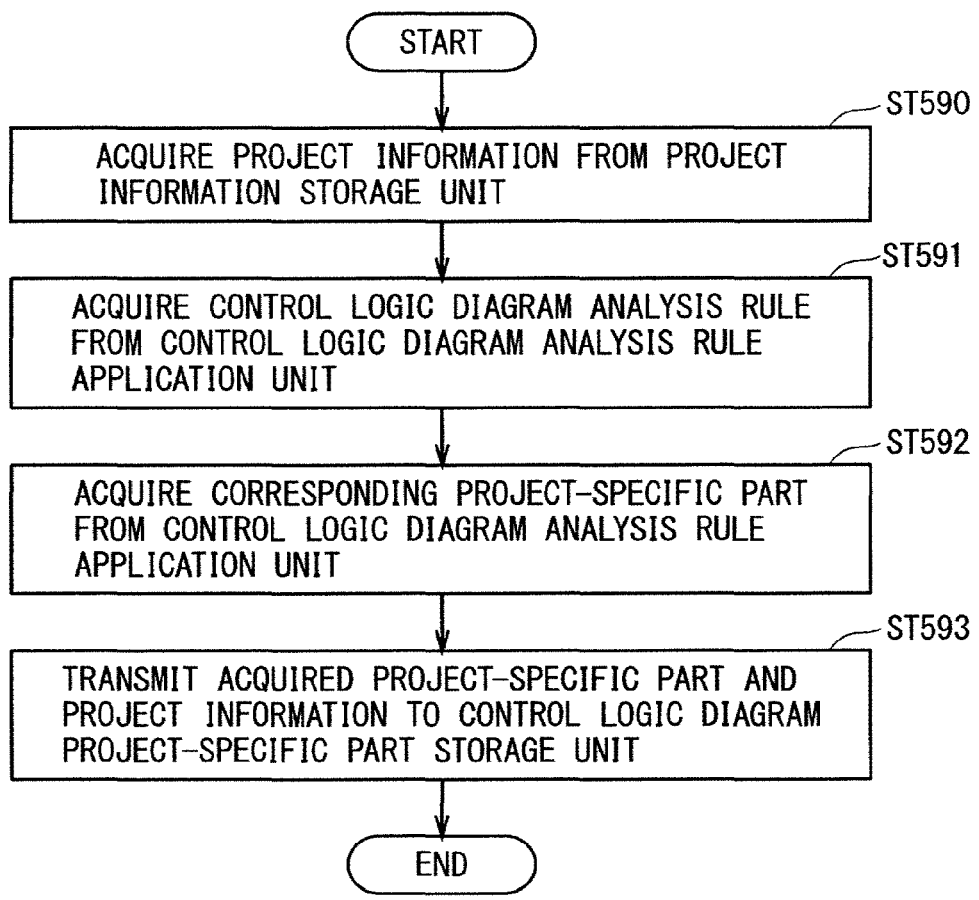

F I G. 2 1
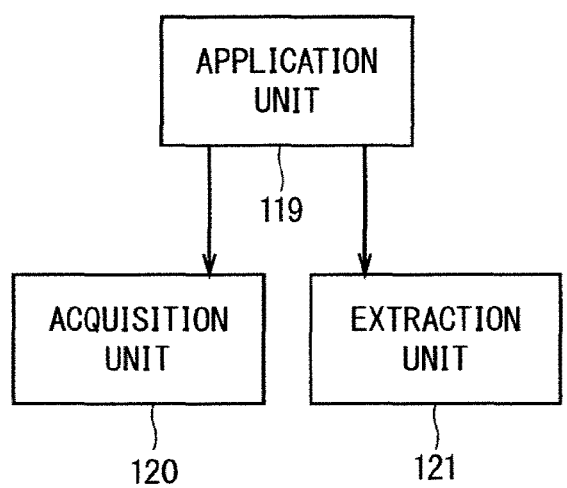

CONTROL LOGIC DIAGRAM ANALYSIS DEVICE AND CONTROL LOGIC DIAGRAM ANALYSIS METHOD

TECHNICAL FIELD

The present technology relates to a control logic diagram analysis device and a control logic diagram analysis method, and particularly relates to analysis of a control logic diagram describing control logic of a control target.

BACKGROUND ART

In development of a plant for water supply and sewerage or the like, a control logic diagram that describes an operation plan defining an operation specification of a facility by a flowchart and a logical operation is often used. However, depending on scale of the plant to develop, several hundred control logic diagrams are needed in some cases, and it is desired to reduce the number of necessary control logic diagrams by efficiently creating the control logic diagrams.

For example, in a case disclosed in Patent Document 1, by using logical connection information or positional information about a signal or a logical element in a control logic diagram, it is possible to retrieve, about logic described in a certain control logic drawing, similar logic included in another control logic diagram. Accordingly, by converting frequently described logic into a component, it becomes possible to reduce the number of necessary control logic diagrams.

PRIOR ART DOCUMENT

Patent Document

Patent Document 1: Japanese Patent Application Laid-Open No. 2012-181821

SUMMARY OF INVENTION

Problems to be Solved by the Invention

However, in a technology disclosed in Patent Document 1, since retrievable similar logic is the shortest match for logic that serves as a reference, there is a problem that logic with part of the whole logic different from the logic that serves as a reference cannot be retrieved. For example, in a case of plant processing, exception processing and the like is often added to normal processing, and efficiency of creating a control logic diagram cannot be sufficiently improved.

The present technology is intended to solve the above-described problem and relates to a control logic diagram analysis device and a control logic diagram analysis method for efficiently creating a control logic diagram.

Means for Solving the Problems

A control logic diagram analysis device according to one aspect of the present technology includes: an application unit configured to sequentially apply, to the control logic diagram, an analysis rule for analyzing a control logic diagram that is a diagram describing control logic of a control target, the analysis rule being layered and having a relationship in which the analysis rule of an upper layer level includes the analysis rule of a lower layer level, the application unit sequentially applying the analysis rule to the control logic diagram from the lower layer level, the control logic diagram analysis device further including: an acquisition unit configured to acquire the analysis rule having an agreement section within the control logic diagram based on an application result of the analysis rule; and an extraction unit configured to extract an element in the control logic diagram corresponding to the analysis rule having the agreement section within the control logic diagram based on the application result of the analysis rule.

A control logic diagram analysis method according to one aspect of the present technology includes: sequentially applying, to the control logic diagram, an analysis rule for analyzing a control logic diagram that is a diagram describing control logic of a control target, the analysis rule being layered and having a relationship in which the analysis rule of an upper layer level includes the analysis rule of a lower layer level, the sequentially applying the analysis rule to the control logic diagram including sequentially applying the analysis rule to the control logic diagram from the lower layer level; acquiring the analysis rule having an agreement section within the control logic diagram based on an application result of the analysis rule; and extracting an element in the control logic diagram corresponding to the analysis rule having the agreement section within the control logic diagram based on the application result of the analysis rule.

Effects of the Invention

The control logic diagram analysis device according to one aspect of the present technology includes an application unit, an acquisition unit, and an extraction unit. The application unit sequentially applies, to the control logic diagram, an analysis rule for analyzing a control logic diagram that is a diagram describing control logic of a control target. The analysis rule is layered and has a relationship in which the analysis rule of an upper layer level includes the analysis rule of a lower layer level. The application unit sequentially applies the analysis rule to the control logic diagram from the lower layer level. The acquisition unit acquires the analysis rule having an agreement section within the control logic diagram based on an application result of the analysis rule. The extraction unit extracts an element in the control logic diagram corresponding to the analysis rule having the agreement section within the control logic diagram based on the application result of the analysis rule.

According to such a configuration, even for the control logic diagram with part of the entire control logic diagram different from the analysis rule, by analyzing the control logic diagram using the layered analysis rule, the analysis rule having the agreement section within the control logic diagram can be acquired, and furthermore, the element in the control logic diagram corresponding to the analysis rule having the agreement section within the control logic diagram can be extracted. Therefore, the control logic diagram can be efficiently created by using the analysis rule of the layer level and the element corresponding to the analysis rule.

A control logic diagram analysis method according to one aspect of the present technology includes: sequentially applying, to the control logic diagram, an analysis rule for analyzing a control logic diagram that is a diagram describing control logic of a control target, the analysis rule being layered and having a relationship in which the analysis rule of an upper layer level includes the analysis rule of a lower layer level, the sequentially applying the analysis rule to the control logic diagram including sequentially applying the analysis rule to the control logic diagram from the lower layer level; acquiring the analysis rule having an agreement section within the control logic diagram based on an application result of the analysis rule; and extracting an element in the control logic diagram corresponding to the analysis rule having the agreement section within the control logic diagram based on the application result of the analysis rule.

According to such a configuration, even for the control logic diagram with part of the entire control logic diagram different from the analysis rule, by analyzing the control logic diagram using the layered analysis rule, the analysis rule having the agreement section within the control logic diagram can be acquired, and furthermore, the element in the control logic diagram corresponding to the analysis rule having the agreement section within the control logic diagram can be extracted. Therefore, the control logic diagram can be efficiently created by using the analysis rule of the layer level and the element corresponding to the analysis rule.

Objectives, features, aspects, and advantages of the present technology will become more apparent in the following detailed description and the accompanying drawings.

BRIEF DESCRIPTION OF DRAWINGS

FIG. 2 is a diagram illustrating a configuration of hardware when the control logic diagram analysis device in FIG. 1 is actually operated.

FIG. 5 is a diagram illustrating an example of project information that is input from a project information input unit.

FIG. 6 is a diagram illustrating examples of a control logic diagram analysis rule that is input from a control logic diagram analysis rule input unit.

FIG. 13 is a flowchart illustrating an operation of the control logic diagram analysis rule layering unit according to the embodiment.

FIG. 14 is a flowchart illustrating an operation of a control logic diagram analysis rule extraction unit according to the embodiment.

FIG. 17 is a flowchart illustrating an operation of a control logic diagram project-specific part extraction unit according to the embodiment.

FIG. 21 is a diagram conceptually illustrating a configuration of the control logic diagram analysis device according to the embodiment.

DESCRIPTION OF EMBODIMENTS

Hereinafter, embodiments will be described with reference to the accompanying drawings. Note that the drawings are schematically illustrated, and a size and positional interrelationship of images illustrated in each of the different drawings are not necessarily described accurately and may be changed as appropriate. Also, in the following description, similar components are illustrated with identical symbols assigned, and names and functions thereof are also illustrated similarly. Therefore, detailed description thereof may be omitted.

<First Embodiment>
<Configuration>

FIG. 21 is a diagram conceptually illustrating a configuration of a control logic diagram analysis device according to the present embodiment.

The control logic diagram analysis device illustrated in FIG. 21 includes an application unit 119, an acquisition unit 120, and an extraction unit 121.

The application unit 119 is a functional unit that sequentially applies, to a control logic diagram, an analysis rule for analyzing the control logic diagram that is a diagram describing control logic of a control target. The analysis rule is layered, and has a relationship in which the analysis rule of an upper layer level includes the analysis rule of a lower layer level. The application unit 119 applies the analysis rule to the control logic diagram sequentially from the lower layer level. The acquisition unit 120 acquires the analysis rule having an agreement section within the control logic diagram based on an application result of the analysis rule. The extraction unit 121 extracts an element in the control logic diagram corresponding to the analysis rule having the agreement section within the control logic diagram based on the application result of the analysis rule.

Figure 1:
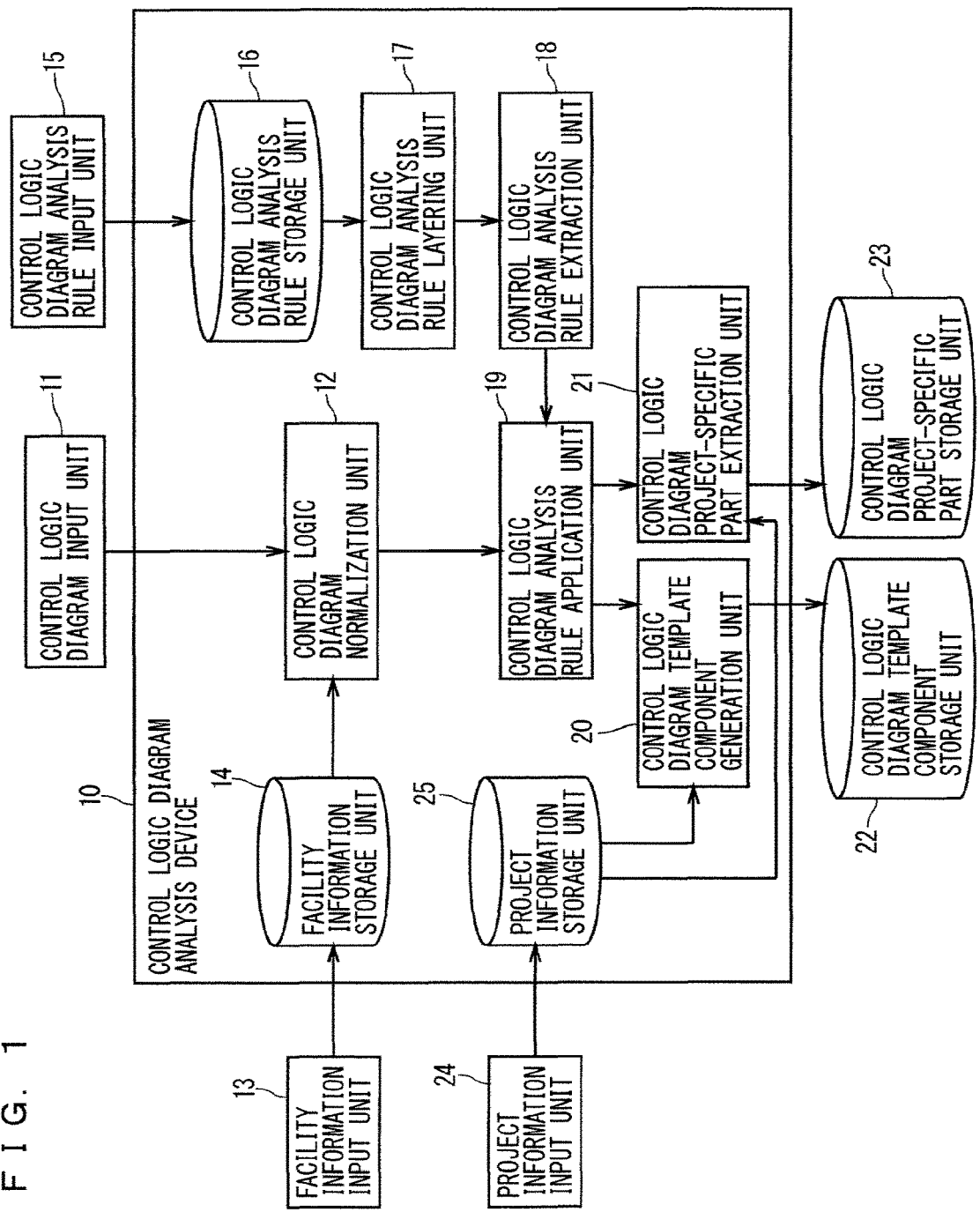
FIG. 1 is a diagram conceptually illustrating a configuration of a control logic diagram analysis device and a configuration related thereto according to an embodiment.

FIG. 1 is a diagram more specifically illustrating a configuration of a control logic diagram analysis device 10 and a configuration related thereto above-described according to the present embodiment.

As illustrated in FIG. 1, the control logic diagram analysis device 10 includes a control logic diagram input unit 11 that inputs the control logic diagram that is an analysis target, a facility information input unit 13 that inputs facility information that is information regarding a facility in the control logic diagram, a facility information storage unit 14 that stores the facility information, a control logic diagram normalization unit 12 that abstracts the facility in the control logic diagram by using the facility information and extracts a logical connection relationship between the facility and an element in the control logic diagram (logical operator such as AND or OR, or timer, and the like), a control logic diagram analysis rule input unit 15 that inputs a control logic diagram analysis rule that is a rule for analyzing the control logic diagram and extracting a template component, a control logic diagram analysis rule storage unit 16 that stores the control logic diagram analysis rule, a control logic diagram analysis rule layering unit 17 that layers the control logic diagram analysis rule, a control logic diagram analysis rule extraction unit 18 that extracts, from the layered control logic diagram analysis rule, the control logic diagram analysis rule that is applied to the input control logic diagram, a control logic diagram analysis rule application unit 19 that applies the extracted control logic diagram analysis rule to the input control logic diagram, a project information input unit 24 that inputs project information (such as target customer or plant) corresponding to the control logic diagram that is an analysis target, a project information storage unit 25 that stores the project information, a control logic diagram template component generation unit 20 that extracts the template component of the control logic diagram from a result of application of the control logic diagram analysis rule to the input control logic diagram, a control logic diagram project-specific part extraction unit 21 that extracts a variable part (that is, project-specific part) that serves as a parameter for the template component, a control logic diagram template component storage unit 22 that stores the generated template component together with the project information, and a control logic diagram project-specific part storage unit 23 that stores the project-specific part of the template component together with the project information.

The control logic diagram analysis rule application unit 19 illustrated in FIG. 1 is included in the application unit 119 illustrated in FIG. 21. The control logic diagram template component generation unit 20 illustrated in FIG. 1 is included in the acquisition unit 120 illustrated in FIG. 21. The control logic diagram project-specific part extraction unit 21 illustrated in FIG. 1 is included in the extraction unit 121 illustrated in FIG. 21.

FIG. 2 is a diagram illustrating a configuration of hardware when the control logic diagram analysis device 10 in FIG. 1 is actually operated. In FIG. 2, a personal computer (PC) 1 is provided as a hardware configuration that implements the control logic diagram analysis device 10 in FIG. 1. However, the hardware configuration that implements the control logic diagram analysis device 10 is not limited to a PC but may be, for example, a general computer.

In the PC 1, a central arithmetic processing unit (central processing unit, that is, CPU) 2 that performs an arithmetic operation, a storage device 3 that can store information, an input device 4 that can input information, such as a keyboard, and an output device 5 that can output a signal, such as a display, are included. This configuration is also similar in another embodiment to be described later.

The facility information storage unit 14, the control logic diagram analysis rule storage unit 16, the control logic diagram template component storage unit 22, the control logic diagram project-specific part storage unit 23, and the project information storage unit 25 are implemented by the storage device 3 in the PC 1. The storage device 3 is constituted by a memory (storage medium) or the like including, for example, a hard disk (Hard disk drive, that is, HDD), a random access memory (random access memory, that is, RAM), and a read only memory (read only memory, that is, ROM), and the like.

Also, the control logic diagram normalization unit 12, the control logic diagram analysis rule layering unit 17, the control logic diagram analysis rule extraction unit 18, the control logic diagram template component generation unit 20, and the control logic diagram project-specific part extraction unit 21 are implemented by a program stored in the storage device 3 being executed on the CPU 2. Note that these functions may be implemented, for example, by a plurality of CPUs cooperating with each other.

Also, the control logic diagram input unit 11, the facility information input unit 13, the control logic diagram analysis rule input unit 15, and the project information input unit 24 are implemented by the input device 4.

Figure 3:
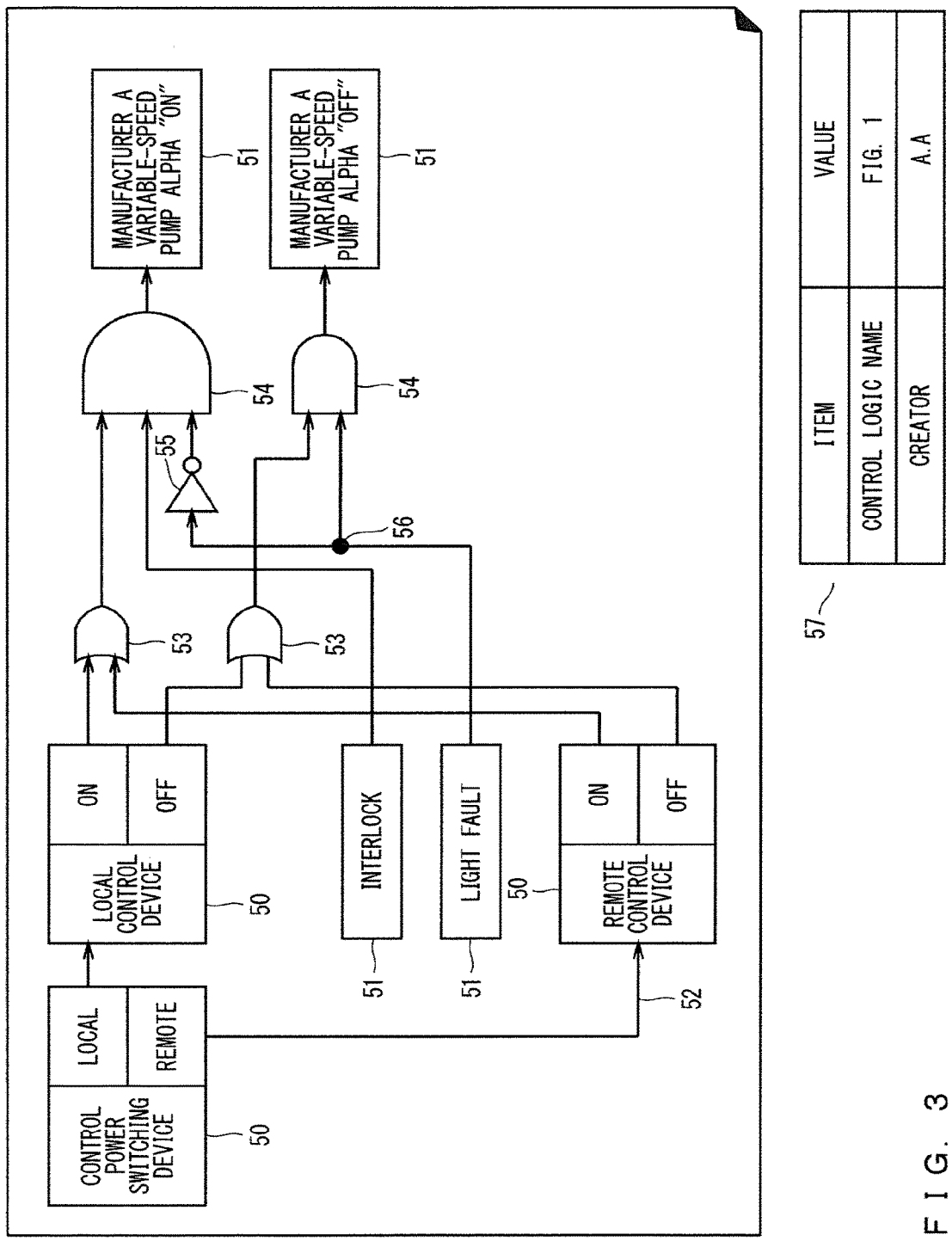
FIG. 3 is a diagram illustrating an example of a control logic diagram that is input from a control logic diagram input unit.

FIG. 3 is a diagram illustrating an example of the control logic diagram that is input from the control logic diagram input unit 11 in FIG. 1.

In FIG. 3, logical operation elements are denoted as MIL logic symbols, and regarding facilities 50 such as a control power switching device, a local control device, and a remote control device, or processing 51 such as interlock and light fault, connection of an input signal and an output signal is denoted as a connection line 52, and a direction of a signal is denoted as an arrow. When a signal branches, the branch is denoted using a junction 56. Note that examples of the logical operation element include an OR operator 53, an AND operator 54, or a NOT operator 55, and besides, an exclusive OR operator and the like. Note that the control logic diagram according to the present embodiment is not limited to the example of FIG. 3, and is required at least to be denoted by notation indicating a relationship between input and output signals to processing, and a logical operator, such as an FBD language (function block diagram) or an SFC language (sequential function chart) prescribed by IEC 61131-3.

Control logic diagram information 57 defines attribute information, such as a creator, including at least a name of the control logic diagram. The control logic diagram information 57 does not need to be illustrated and only needs to be associated with the control logic diagram. In the example of FIG. 3, it is indicated that the name of the control logic diagram of FIG. 3 is "FIG. 1", and that the creator is "A. A."

Figure 4:
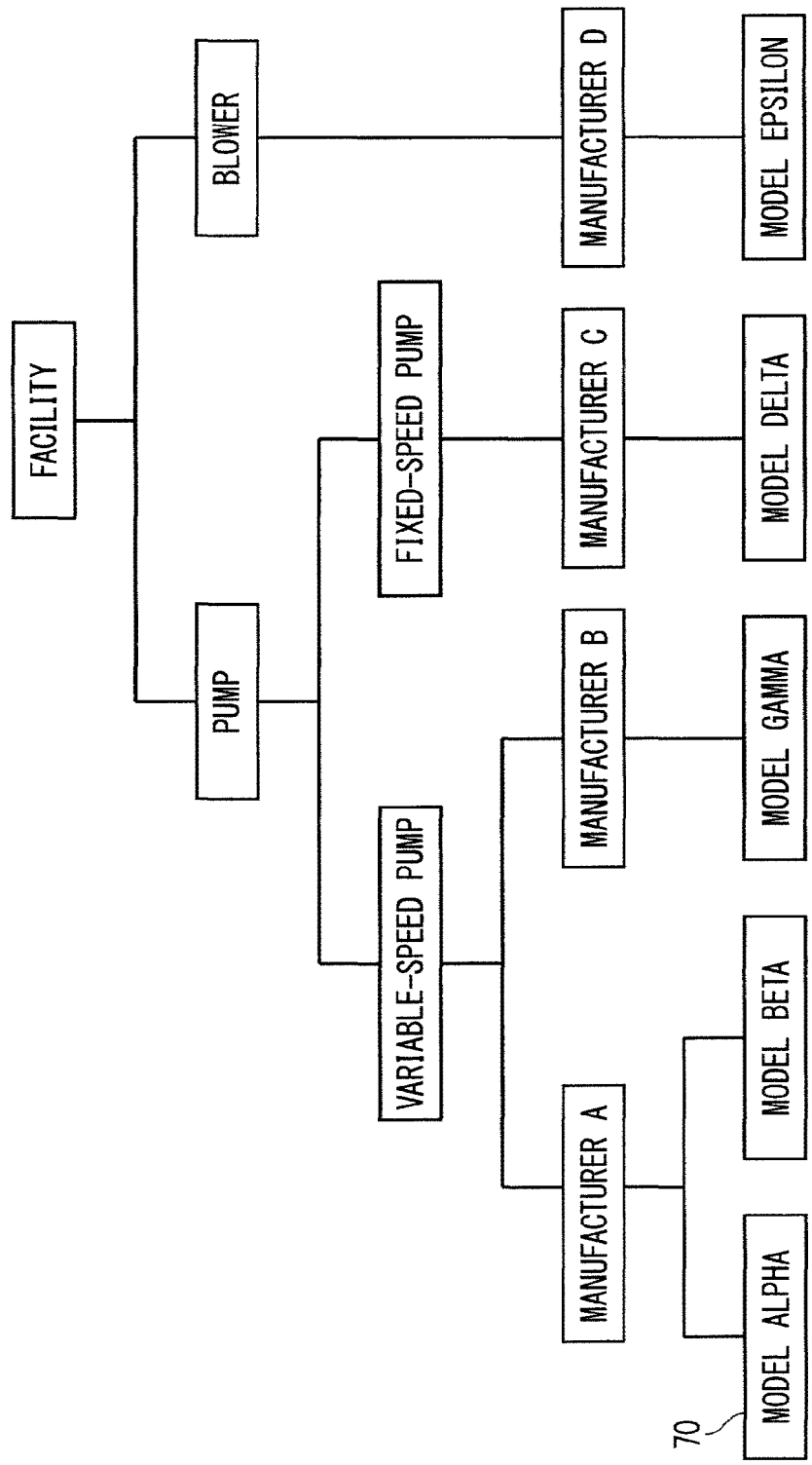
FIG. 4 is a diagram illustrating an example of facility information that is input from a facility information input unit.

FIG. 4 is a diagram illustrating an example of the facility information that is input from the facility information input unit 13 in FIG. 1. The facility information is information that hierarchically describes descriptors 70 each describing a type of facility or a model number of facility and the like as a tree structure in order to abstract the facility 50 in the control logic diagram.

In FIG. 4, the descriptor 70 of the lowest level of the hierarchical structure (leaf of the tree structure) describes a specific model number of a device or a model of the device, and the descriptor 70 thereabove describes a manufacturer name of the device. The descriptor 70 above the manufacturer name describes a type of device. The type of device is described such that the upper descriptor 70 includes description of the descriptor 70 therebelow. In FIG. 4, it is defined that the descriptor 70 above a variable-speed pump and a fixed-speed pump is a pump. The facility information in the present embodiment is not limited to a format illustrated in FIG. 4, but is required at least to be a format that can define a hierarchical relationship of the descriptors 70, such as a table format.

FIG. 5 is a diagram illustrating an example of the project information that is input from the project information input unit 24 in FIG. 1. The project information is information for identifying a target project in the control logic diagram that is input from the control logic diagram input unit 11.

In the project information illustrated in FIG. 5, it is defined that a project ID that uniquely determines the project is "A0001", a customer ID is "B0001", a country of the customer is "Japan", an installation country of the target project is "Japan", a target project name is "pumping station C", a type of target project is "pumping station", and quantity of water to be treated is "10kL." The project information is not limited to what is illustrated in FIG. 5, and only needs to include an ID or name that uniquely indicates the project information, and at least one or more other items. The items of the project information may be determined for each project of a control target.

FIG. 6 is a diagram illustrating examples of the control logic diagram analysis rule that is input from the control logic diagram analysis rule input unit 15. The control logic diagram analysis rule is a rule for analyzing the control logic diagram and extracting a template component.

In FIG. 6, three control logic diagram analysis rules of "Basic processing rule No. 1", "precondition rule No. 1", and "remote monitoring function rule No. 1" are illustrated. The control logic diagram analysis rules each include process components 80 and logical operator components. The logical operator components include an AND operator component 81, a NOT operator component 82, or an OR operator component 83, or the like.

The control logic diagram analysis rule application unit 19 retrieves a section that agrees with the process components 80 and the logical operator components in the control logic diagram analysis rule. In the agreement section retrieval, an element in the control logic diagram corresponding to an interior of each process component 80 may be a single signal or the like, or may be a plurality of devices or a plurality of processes connected with a logical operator, or the like.

The "Basic processing rule No. 1" in FIG. 6 indicates that when both output of an input unit included in the process component 80 and output of a precondition unit included in the process component 80 are true (true), an output unit included in the process component 80 is performed. This indicates that output is performed when the input unit has input in a stage where the precondition unit is satisfied.

Also, the "precondition rule No. 1" in FIG. 6 indicates that when output of an interlock unit included in the process component 80 is true (true) and output of a fault determination unit included in the process component 80 is false (false), output of the entire rule is true (true). This indicates that when the interlock unit has not started, that is, when a normal operation is performed and a fault has not occurred, the precondition is satisfied.

Also, the "remote monitoring function rule No. 1" in FIG. 6 indicates that a Local/Remote determination unit included in the process component 80 determines Local control or Remote control, and in a case of Local control, a Local processing unit included in the process component 80 performs Local control, and in a case of Remote control, a Remote processing unit included in the process component 80 performs Remote control. A result of the Local control or a result of the Remote control is output to an output unit included in the process component 80.

Figure 7:
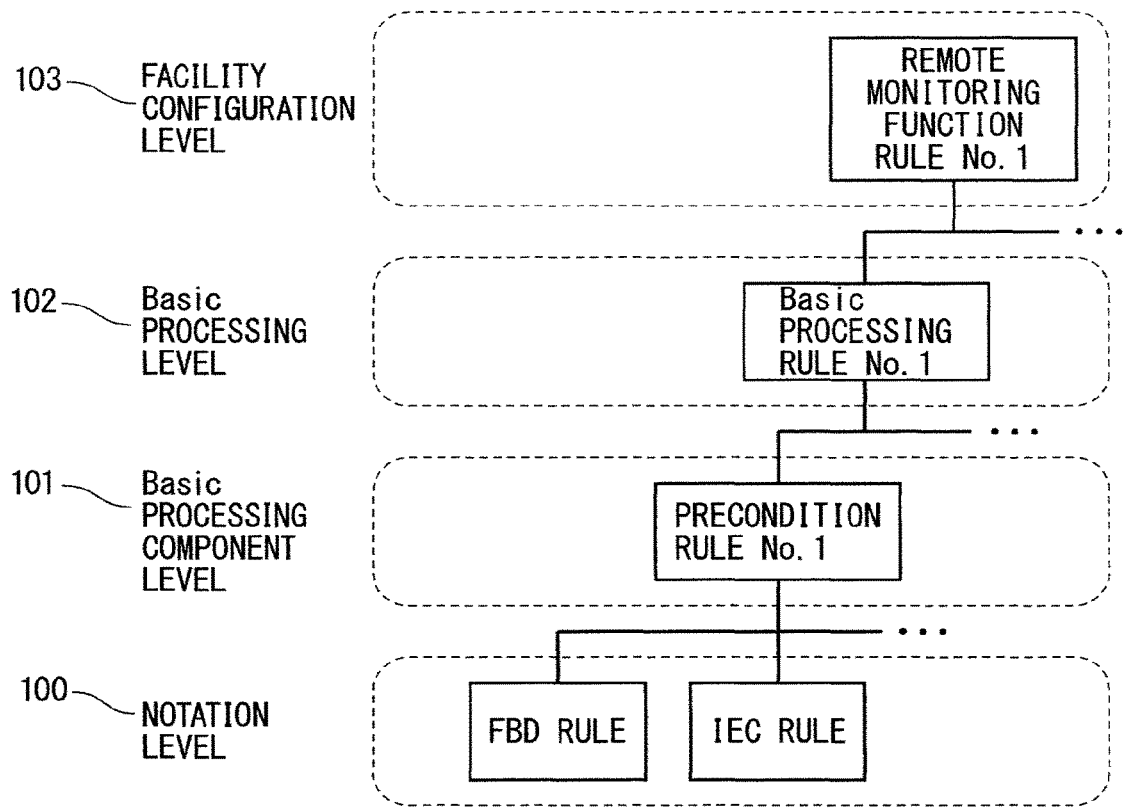
FIG. 7 is a diagram illustrating an example of a layered analysis rule when a control logic diagram analysis rule layering unit layers the control logic diagram analysis rule.

FIG. 7 is a diagram illustrating an example of a layered analysis rule when the control logic diagram analysis rule layering unit 17 layers the control logic diagram analysis rule. The layered analysis rule is obtained by layering the individual control logic diagram analysis rule into each level, such as a notation level 100, a Basic processing component level 101, a Basic processing level 102, and a facility configuration level 103.

Each layer level has a relationship in which the control logic diagram analysis rule of an upper layer level includes the control logic diagram analysis rule of a lower layer level. For example, the notation level 100 determines notation of the control logic diagram that is an analysis target. In FIG. 7, the notation level 100 is adapted to allow selection between FBD (Function Block Diagram) and IEC notation, and designates notation of the process component 80 or logical operator component in each rule of the Basic processing component level 101 or upper levels. The Basic processing component level 101 designates contents of the process component 80 in the Basic processing rule corresponding to the Basic processing level. In FIG. 7, the "Basic processing rule No. 1" of the Basic processing level 102 is positioned above the "precondition rule No. 1" of the Basic processing component level 101. In this case, details of the precondition unit included in the process component 80 of the "Basic processing rule No. 1" in FIG. 6 are the "precondition rule No. 1." Also, in FIG. 7, the "remote monitoring function rule No. 1" of the facility configuration level 103 is positioned above the "Basic processing rule No. 1" of the Basic processing level 102. In this case, details of the process component 80 of the "remote monitoring function rule No. 1" are the "Basic processing rule No. 1."

Thus, by layering the control logic diagram analysis rule, details of each control logic diagram can be easily switched.

<Operation>

Figure 8:
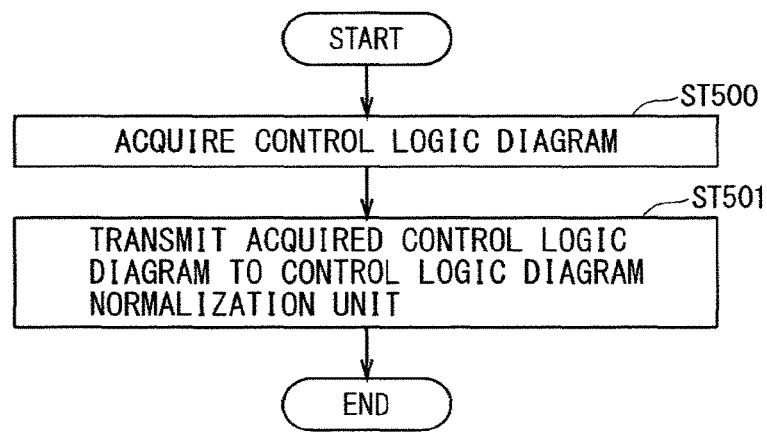
FIG. 8 is a flowchart illustrating an operation of the control logic diagram input unit according to the embodiment.

FIG. 8 is a flowchart illustrating an operation of the control logic diagram input unit 11 according to the present embodiment.

The control logic diagram input unit 11 first acquires a control logic diagram through input from outside (refer to step ST500). Then, advance is made to step ST501. Furthermore, the control logic diagram input unit 11 transmits the acquired control logic diagram to the control logic diagram normalization unit 12, and ends the operation (refer to step ST501).

Figure 9:
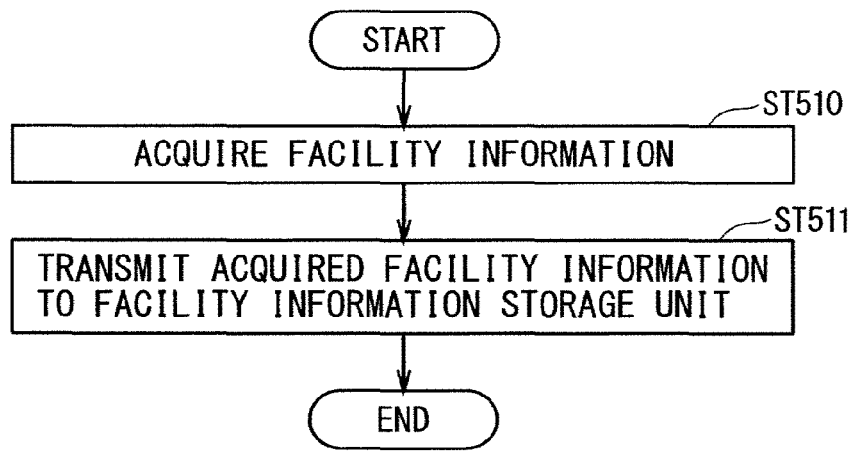
FIG. 9 is a flowchart illustrating an operation of the facility information input unit according to the embodiment.

FIG. 9 is a flowchart illustrating an operation of the facility information input unit 13 according to the present embodiment.

The facility information input unit 13 first acquires facility information through input from outside (refer to step ST510). Then, advance is made to step ST511. Furthermore, the facility information input unit 13 transmits the acquired facility information to the facility information storage unit 14, and ends the operation (refer to step ST512).

Figure 10:
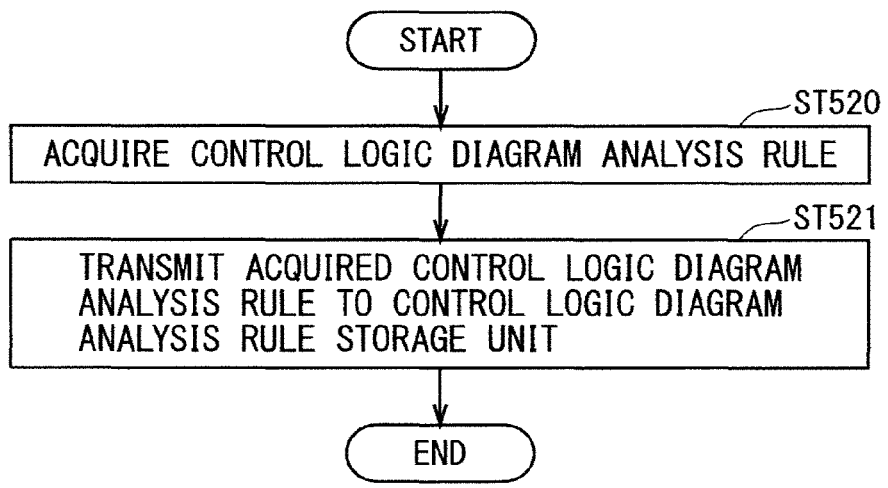
FIG. 10 is a flowchart illustrating an operation of the control logic diagram analysis rule input unit according to the embodiment.

FIG. 10 is a flowchart illustrating an operation of the control logic diagram analysis rule input unit 15 according to the present embodiment.

The control logic diagram analysis rule input unit 15 first acquires a control logic diagram analysis rule through input from outside (refer to step ST520). Then, advance is made to step ST521. Furthermore, the control logic diagram analysis rule input unit 15 transmits the acquired control logic diagram analysis rule to the control logic diagram analysis rule storage unit 16, and ends the operation (refer to step ST521).

Figure 11:
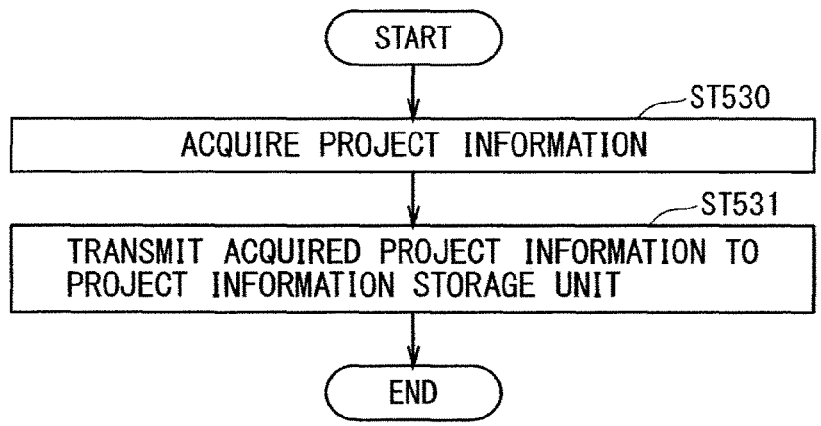
FIG. 11 is a flowchart illustrating an operation of the project information input unit according to the embodiment.

FIG. 11 is a flowchart illustrating an operation of the project information input unit 24 according to the present embodiment.

The project information input unit 24 first acquires project information through input from outside (refer to step ST530). Then, advance is made to step ST531. Furthermore, the project information input unit 24 transmits the acquired project information to the project information storage unit 25, and ends the operation (refer to step ST531).

Figure 12:
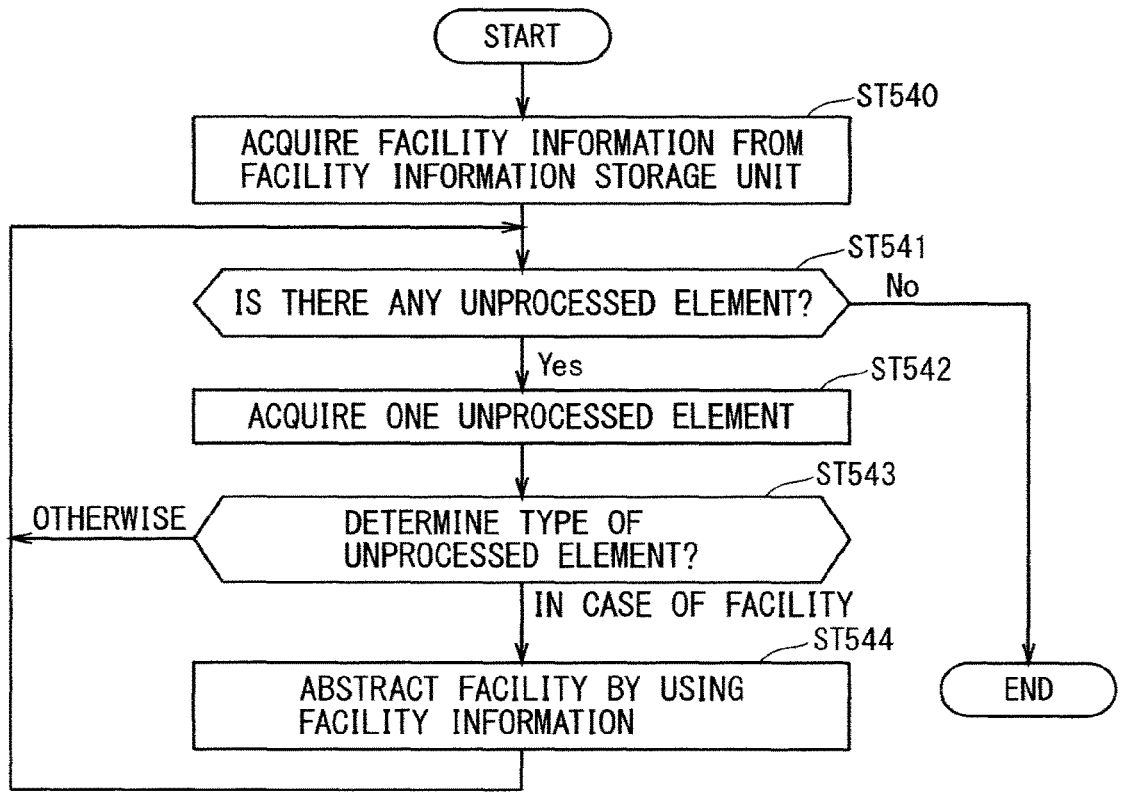
FIG. 12 is a flowchart illustrating an operation of a control logic diagram normalization unit according to the embodiment.

FIG. 12 is a flowchart illustrating an operation of the control logic diagram normalization unit 12 according to the present embodiment.

The control logic diagram normalization unit 12 first acquires the facility information from the facility information storage unit 14 (refer to step ST540). Then, advance is made to step ST541. Furthermore, the control logic diagram normalization unit 12 determines whether there is any unprocessed element that is an element unprocessed and has not undergone determination in step ST543 in the control logic diagram, and when there is (corresponding to YES), advance is made to step ST542. On the other hand, when there is no unprocessed element that has not undergone determination in step ST543 in the control logic diagram (corresponding to NO), the operation is ended. Here, the element is contents of logic described in the control logic diagram, and specifically, the facility 50, the processing 51, the connection line 52, the junction 56, or each operator or the like illustrated in FIG. 3.

Next, the control logic diagram normalization unit 12 acquires the unprocessed element in the control logic diagram (refer to step ST542). Then, advance is made to step ST543. Furthermore, the control logic diagram normalization unit 12 determines a type of unprocessed element (refer to step ST543). When the unprocessed element is the facility 50, advance is made to step ST544. On the other hand, when the unprocessed element is other than the facility 50, return is made to step ST541.

Next, the control logic diagram normalization unit 12 abstracts the facility by using the facility information (refer to step ST544). For example, when the facility is a "model alpha", the facility is abstracted to the top "facility". Then, return is made to step ST541.

FIG. 13 is a flowchart illustrating an operation of the control logic diagram analysis rule layering unit 17 according to the present embodiment.

The control logic diagram analysis rule layering unit 17 first sets each layer level of the layered analysis rule and a hierarchical relationship thereof (refer to step ST550). Then, advance is made to step ST551. Furthermore, the control logic diagram analysis rule layering unit 17 determines whether there is any unprocessed control logic diagram analysis rule in the layered analysis rule (refer to step ST551), and when there is an unprocessed control logic diagram analysis rule (corresponding to YES), advance is made to step ST552. On the other hand, when there is no unprocessed control logic diagram analysis rule (corresponding to NO), advance is made to step ST555.

When there is an unprocessed control logic diagram analysis rule, the control logic diagram analysis rule layering unit 17 acquires one unprocessed control logic diagram analysis rule from the control logic diagram analysis rule storage unit 16 (refer to step ST552), and advances to step ST553. Furthermore, the control logic diagram analysis rule layering unit 17 sets a layer level of the layered analysis rule for the unprocessed control logic diagram analysis rule (refer to step ST553), and advances to step ST554. Also, the control logic diagram analysis rule layering unit 17 sets a hierarchical relationship for the control logic diagram analysis rule (refer to step ST554), and returns to step ST551.

On the other hand, when there is no unprocessed control logic diagram analysis rule, the control logic diagram analysis rule layering unit 17 transmits the processed layered analysis rule to the control logic diagram analysis rule extraction unit 18 (refer to step ST555), and ends the operation.

FIG. 14 is a flowchart illustrating an operation of the control logic diagram analysis rule extraction unit 18 according to the present embodiment.

The control logic diagram analysis rule extraction unit 18 first acquires the layered analysis rule from the control logic diagram analysis rule layering unit 17 (refer to step ST560). Then, advance is made to step ST561. Furthermore, the control logic diagram analysis rule extraction unit 18 acquires the notation level that is a leaf of the layered analysis rule, in other words, the lowest layer level, and sets the notation level as the current layer level (current level) (refer to step ST561). Then, advance is made to step ST562.

Next, the control logic diagram analysis rule extraction unit 18 determines whether a layer level above the current layer level exists in the layered analysis rule (refer to step ST562). When a layer level above the current layer level exists, advance is made to step ST563. On the other hand, when a layer level above the current layer level does not exist, the operation is ended.

When a layer level above the current layer level exists, the control logic diagram analysis rule extraction unit 18 acquires the lowest layer level from among the layer levels above the current layer level, and sets the layer level as the current level (refer to step ST563). Then, advance is made to step ST564.

Next, the control logic diagram analysis rule extraction unit 18 acquires one control logic diagram analysis rule of the current level (refer to step ST564). Then, advance is made to step ST565. Furthermore, the control logic diagram analysis rule extraction unit 18 transmits the acquired control logic diagram analysis rule to the control logic diagram analysis rule application unit 19 (refer to step ST565). Then, return is made to step ST562.

Figure 15:
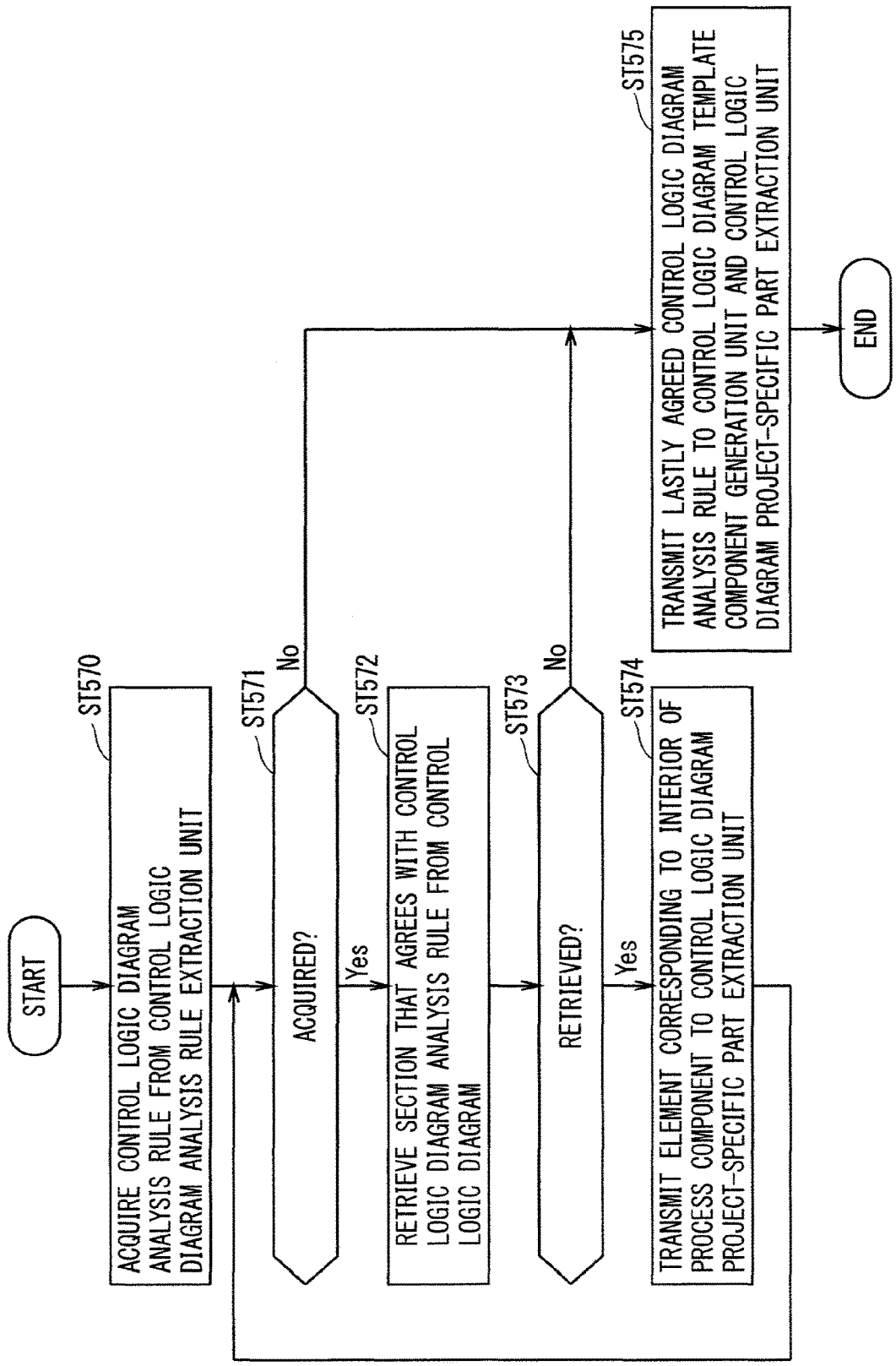
FIG. 15 is a flowchart illustrating an operation of a control logic diagram analysis rule application unit according to the embodiment.

FIG. 15 is a flowchart illustrating an operation of the control logic diagram analysis rule application unit 19 according to the present embodiment.

The control logic diagram analysis rule application unit 19 first attempts to acquire the control logic diagram analysis rule from the control logic diagram analysis rule extraction unit 18 (refer to step ST570). Then, advance is made to step ST571. Furthermore, the control logic diagram analysis rule application unit 19 determines whether the control logic diagram analysis rule can be acquired (refer to step ST571). When the control logic diagram analysis rule can be acquired (corresponding to YES), advance is made to step ST572. On the other hand, when the control logic diagram analysis rule cannot be acquired (corresponding to NO), advance is made to step ST575.

When the control logic diagram analysis rule can be acquired, the control logic diagram analysis rule application unit 19 applies the control logic diagram analysis rule to the control logic diagram, and retrieves a section that agrees with the control logic diagram analysis rule from the control logic diagram (refer to step ST572). Then, advance is made to step ST573. Furthermore, the control logic diagram analysis rule application unit 19 determines whether an agreement section can be retrieved (refer to step ST573). When the agreement section can be retrieved (corresponding to YES), advance is made to step ST574. On the other hand, when the agreement section cannot be retrieved (corresponding to NO), advance is made to step ST575.

When the agreement section can be retrieved, the control logic diagram analysis rule application unit 19 transmits, to the control logic diagram project-specific part extraction unit 21, an element in the control logic diagram corresponding to an interior of the process component 80 of the control logic diagram analysis rule, that is, a single signal or a plurality of devices or a plurality of processes connected with a logical operator and the like as a project-specific part (refer to step ST574). Then, return is made to step ST570.

On the other hand, when the control logic diagram analysis rule cannot be acquired in step ST571, and when the agreement section cannot be retrieved in step ST573, the control logic diagram analysis rule application unit 19 transmits the lastly agreed control logic diagram analysis rule to the control logic diagram template component generation unit 20 and the control logic diagram project-specific part extraction unit 21 (refer to step ST575). Here, since the control logic diagram analysis rule application unit 19 applies the control logic diagram analysis rule to the control logic diagram sequentially from the lower layer level, the lastly agreed control logic diagram analysis rule corresponds to the control logic diagram analysis rule of the top layer level that has an agreement section. Then, the operation is ended. Note that in this case, not only the lastly agreed control logic diagram analysis rule, but also the control logic diagram analysis rule agreed by then may be transmitted to the control logic diagram template component generation unit 20 and the control logic diagram project-specific part extraction unit 21.

Figure 16:
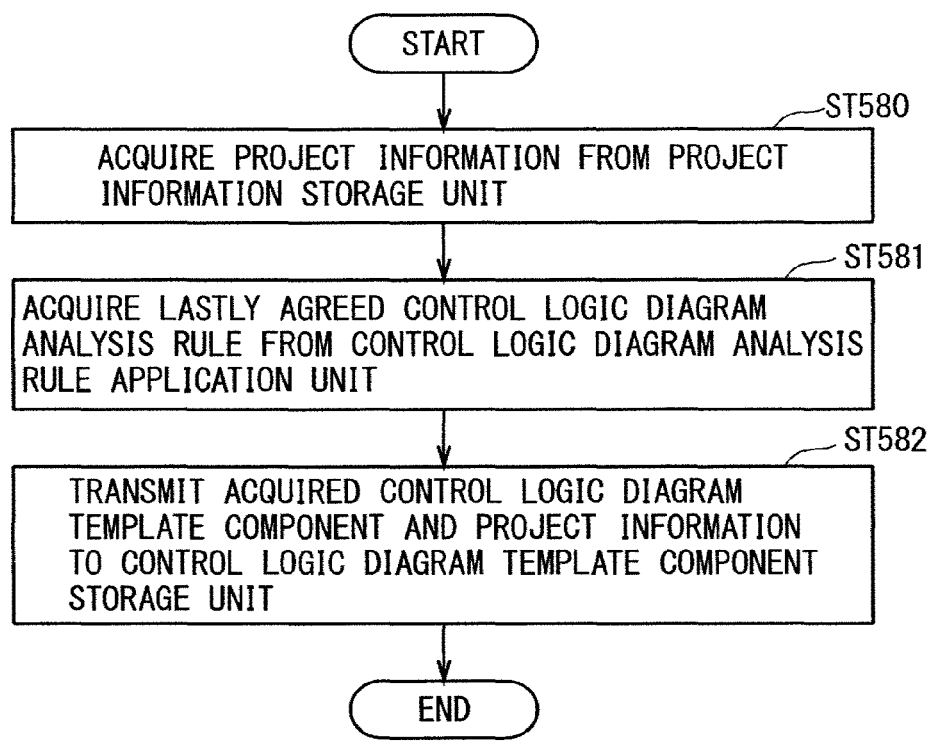
FIG. 16 is a flowchart illustrating an operation of a control logic diagram template component generation unit according to the embodiment.

FIG. 16 is a flowchart illustrating an operation of the control logic diagram template component generation unit 20 according to the present embodiment.

The control logic diagram template component generation unit 20 first acquires the project information from the project information storage unit 25 (refer to step ST580). Then, advance is made to step ST581.

Next, the control logic diagram template component generation unit 20 acquires the lastly agreed control logic diagram analysis rule from the control logic diagram analysis rule application unit 19 as a control logic diagram template component (refer to step ST581). Note that when not only the lastly agreed control logic diagram analysis rule but also the control logic diagram analysis rule agreed by then is transmitted, those control logic diagram analysis rules can also be acquired. Then, advance is made to step ST582.

Furthermore, the control logic diagram template component generation unit 20 extracts the project information corresponding to the acquired control logic diagram template component. Then, the acquired control logic diagram template component and the corresponding project information are transmitted to the control logic diagram template component storage unit 22 (refer to step ST582). Then, the operation is ended.

FIG. 17 is a flowchart illustrating an operation of the control logic diagram project-specific part extraction unit 21 according to the present embodiment.

The control logic diagram project-specific part extraction unit 21 first acquires the project information from the project information storage unit 25 (refer to step ST590). Then, advance is made to step ST591.

Next, the control logic diagram project-specific part extraction unit 21 acquires the control logic diagram analysis rule from the control logic diagram analysis rule application unit 19 (refer to step ST591). Note that when not only the lastly agreed control logic diagram analysis rule but also the control logic diagram analysis rule agreed by then is transmitted, those control logic diagram analysis rules can also be acquired. Then, advance is made to step ST592.

Further more, the control logic diagram project-specific part extraction unit 21 acquires the project-specific part corresponding to the acquired control logic diagram analysis rule, that is, an interior of the process component 80 of the control logic diagram analysis rule from the control logic diagram analysis rule application unit 19 (refer to step ST592). Then, advance is made to step ST593. Then, the control logic diagram project-specific part extraction unit 21 extracts the project information corresponding to the project-specific part of the acquired control logic diagram analysis rule. Then, the acquired project-specific part and the corresponding project information are transmitted to the control logic diagram project-specific part storage unit 23 (refer to step ST593). Then, the operation is ended.

Figure 18:
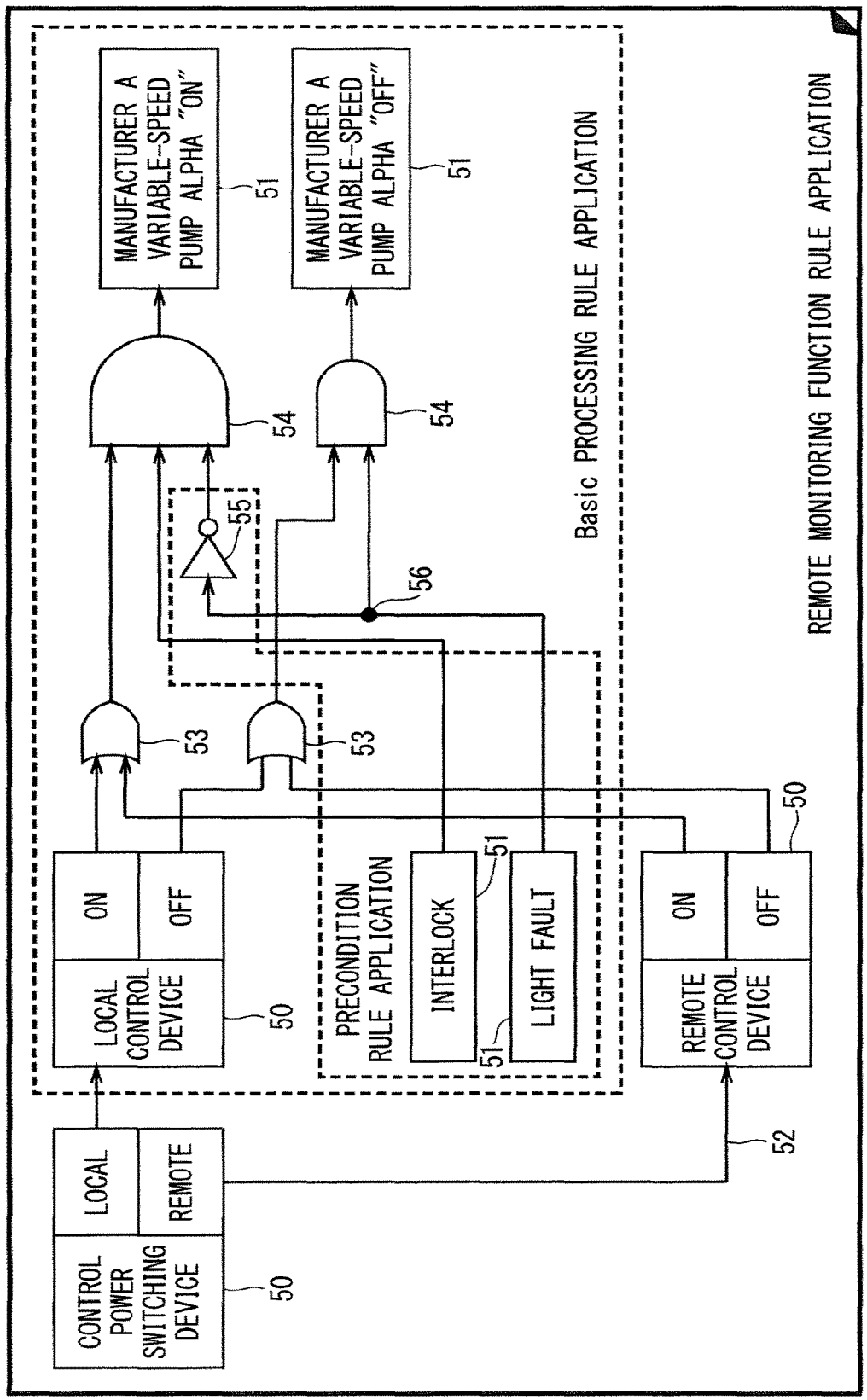
FIG. 18 is a diagram illustrating an application result of the control logic diagram analysis rule application unit according to the embodiment.

FIG. 18 is a diagram illustrating an application result of the control logic diagram analysis rule application unit 19 according to the present embodiment.

In a case illustrated in FIG. 18, to begin with, out of the layered analysis rule, the precondition rule No. 1 of the Basic processing component level 101 is acquired from the control logic diagram analysis rule extraction unit 18, and is applied to the control logic diagram. That is, the control logic diagram analysis rule application unit 19 retrieves a section that agrees with the control logic diagram analysis rule "precondition rule No. 1" from the control logic diagram. In the case illustrated in FIG. 18, the processing 51 (interlock and light fault) and the NOT operator 55 are determined to be the agreement sections. Therefore, elements in the agreement section in the control logic diagram corresponding to an interior of the process component 80 of the control logic diagram analysis rule "precondition rule No. 1" are transmitted to the control logic diagram project-specific part extraction unit 21 as project-specific parts (refer to step ST574).

Subsequently, the Basic processing rule No. 1 of the Basic processing level 102 is acquired from the control logic diagram analysis rule extraction unit 18, and is applied to the control logic diagram. That is, the control logic diagram analysis rule application unit 19 further retrieves a section that agrees with the control logic diagram analysis rule "Basic processing rule No. 1" from the control logic diagram. In the case illustrated in FIG. 18, at least, the facility 50 (local control device), the precondition rule agreement section, the AND operators 54, and the processing 51 (manufacturer A variable-speed pump alpha "on") are determined to be agreement sections. Therefore, the elements in the agreement sections in the control logic diagram corresponding to an interior of the process component 80 of the control logic diagram analysis rule "Basic processing rule No. 1" are transmitted to the control logic diagram project-specific part extraction unit 21 as project-specific parts (refer to step ST574).

Finally, the remote monitoring function rule No. 1 of the facility configuration level 103 is acquired from the control logic diagram analysis rule extraction unit 18, and is applied to the control logic diagram. That is, the control logic diagram analysis rule application unit 19 further retrieves a section that agrees with the control logic diagram analysis rule "remote monitoring function rule No. 1" from the control logic diagram. In the case illustrated in FIG. 18, at least the facility 50 (control power switching device), the Basic processing rule agreement section, the facility 50 (remote control device), and the OR operator 53 are determined to be agreement sections. Therefore, the elements in the agreement sections in the control logic diagram corresponding to an interior of the process component 80 of the control logic diagram analysis rule "remote monitoring function rule No. 1" are transmitted to the control logic diagram project-specific part extraction unit 21 as project-specific parts (refer to step ST574).

By having the configuration described above, the agreement control logic diagram template component of the top layer level and the project-specific part of each layer level can be extracted from the control logic diagram. Therefore, even for the control logic diagram with part of the entire control logic diagram different from the control logic diagram analysis rule, the control logic diagram template component can be efficiently created within an agreement range, and thus reusability of the control logic diagram template component is increased.

<Second Embodiment>
<Configuration>

Hereinafter, a configuration similar to a configuration described in the above-described embodiment is illustrated with identical symbols assigned, and detailed description thereof will be omitted as appropriate.

Figure 19:
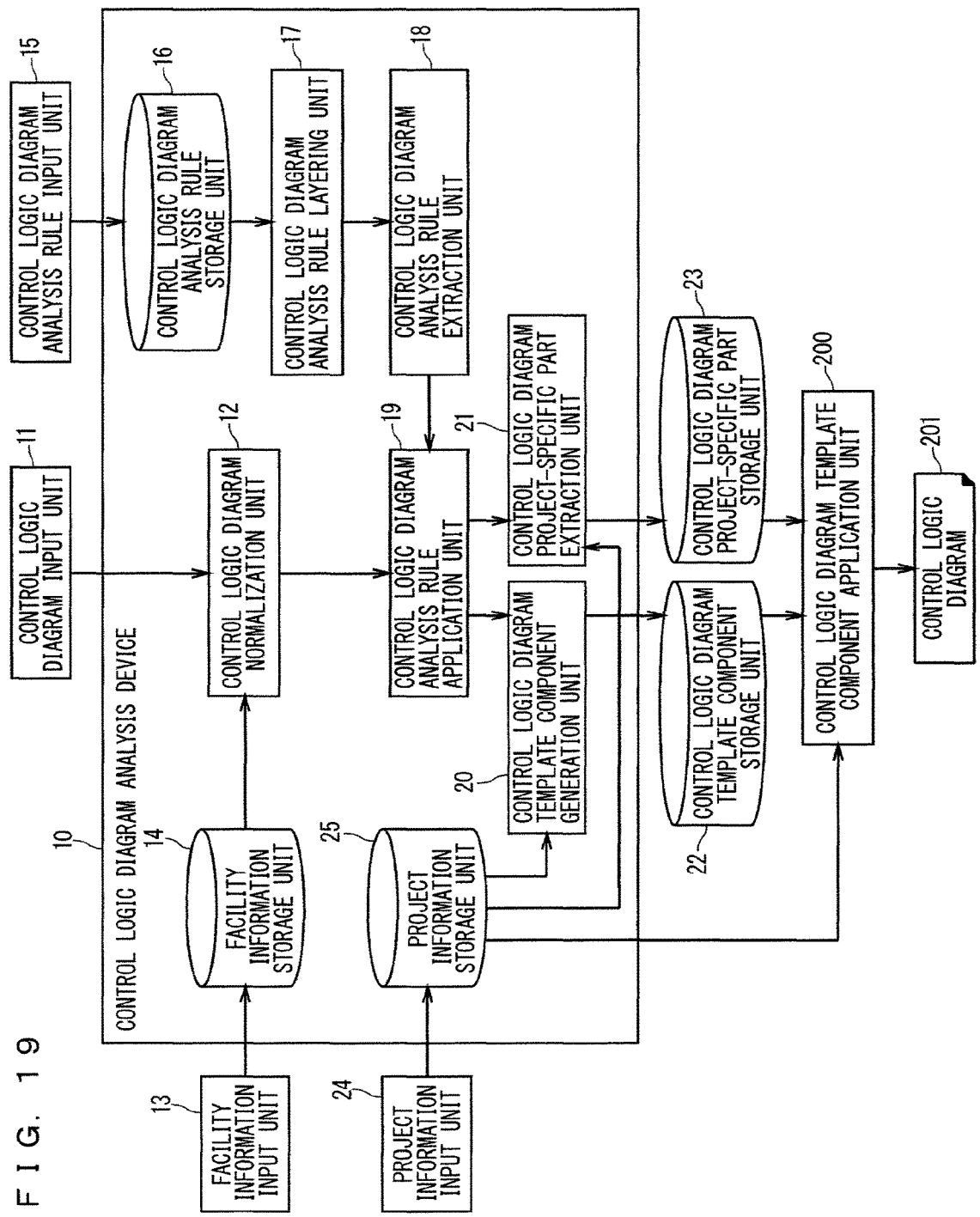
FIG. 19 is a diagram conceptually illustrating a configuration of a control logic diagram analysis device and a configuration related thereto according to an embodiment.

FIG. 19 is a diagram conceptually illustrating a configuration of a control logic diagram analysis device 10 and a configuration related thereto according to the present embodiment.

Out of the configuration illustrated in FIG. 19, a control logic diagram template component application unit 200 that has not been described in a first embodiment will be described. The control logic diagram template component application unit 200 illustrated in FIG. 19 can generate a control logic diagram 201 based on a control logic diagram template component and a project-specific part of the control logic diagram.

<Operation>

Figure 20:
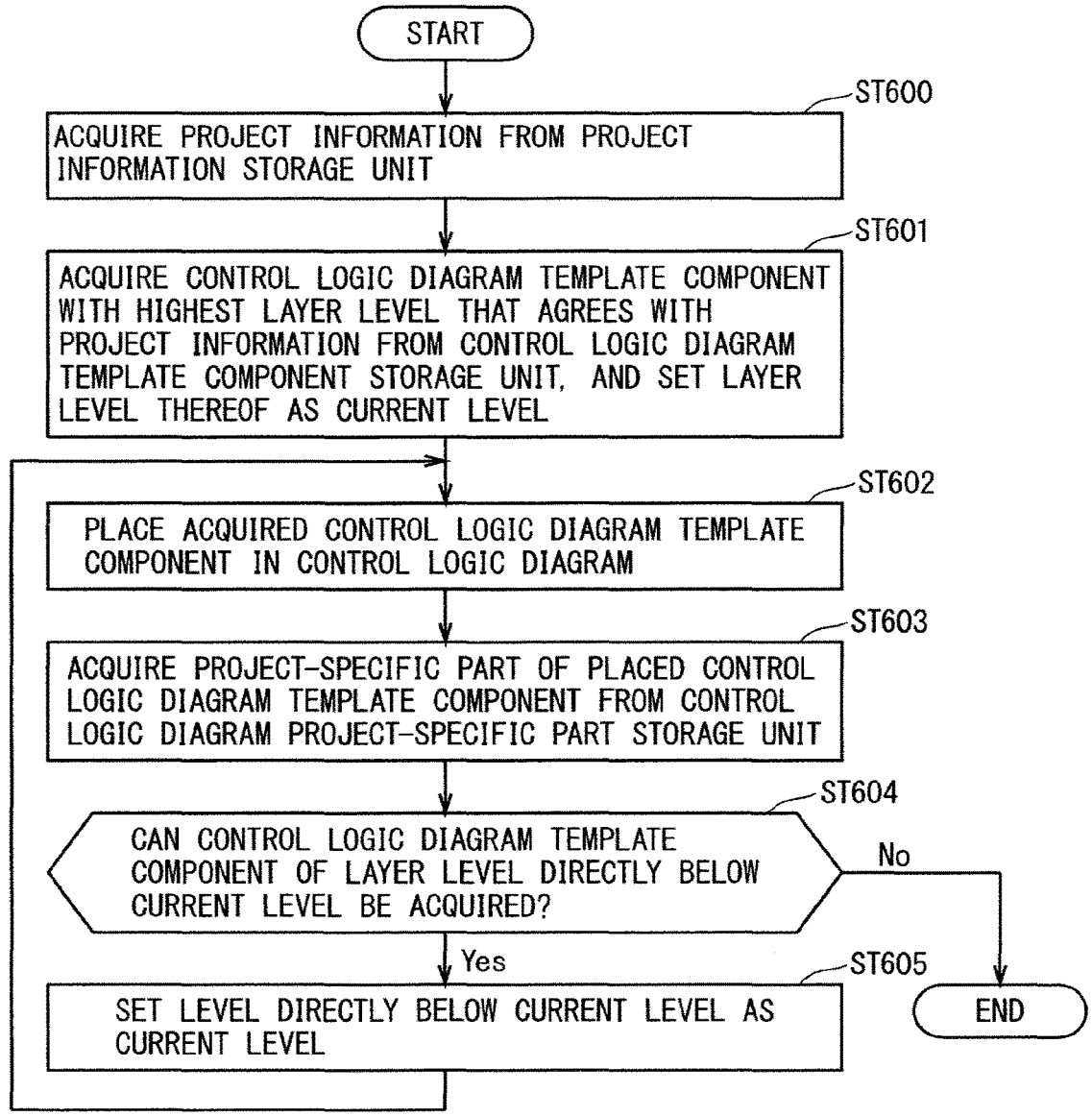
FIG. 20 is a flowchart illustrating an operation of a control logic diagram template component application unit according to the embodiment.

FIG. 20 is a flowchart illustrating an operation of the control logic diagram template component application unit 200 according to the present embodiment.

The control logic diagram template component application unit 200 first acquires project information regarding a target project from a project information storage unit 25 (refer to step ST600). Then, advance is made to step ST601. Furthermore, the control logic diagram template component application unit 200 acquires, from the control logic diagram template component storage unit 22, the control logic diagram template component with the highest layer level out of the control logic diagram template component that agrees with the project information regarding the target project, and sets the layer level as a current level (refer to step ST601). Then, advance is made to step ST602.

Next, the control logic diagram template component application unit 200 places the acquired control logic diagram template component in the control logic diagram (refer to step ST602). Then, advance is made to step ST603. Furthermore, the control logic diagram template component application unit 200 acquires the project-specific part corresponding to the placed control logic diagram template component from a control logic diagram project-specific part storage unit 23 while referring to the project information regarding the target project (refer to step ST603). Then, advance is made to step ST604.

Next, the control logic diagram template component application unit 200 determines whether the control logic diagram template component of a layer level directly below the current level can be acquired (refer to step ST604). When the control logic diagram template component of a layer level directly below the current level can be acquired, advance is made to step ST605. On the other hand, when the control logic diagram template component of a layer level directly below the current level cannot be acquired, the operation is ended.

When the control logic diagram template component of a layer level directly below the current level can be acquired, the control logic diagram template component application unit 200 sets the layer level directly below the current level as the current level (refer to step ST605). Then, return is made to step ST602.

By having the above-described configuration, the generated control logic diagram template component and the corresponding project-specific part can be determined hierarchically while referring to the project information regarding the target project. Therefore, the control logic diagram can be efficiently created by using these control logic diagram template component and the corresponding project-specific part.

<Effects>

Hereinafter, effects produced by the embodiments will be illustrated.

According to the embodiments, the control logic diagram analysis device includes the control logic diagram analysis rule application unit 19 included in the application unit 119, the control logic diagram template component generation unit 20 included in the acquisition unit 120, and the control logic diagram project-specific part extraction unit 21 included in the extraction unit 121.

The control logic diagram analysis rule application unit 19 sequentially applies, to the control logic diagram, the control logic diagram analysis rule that is an analysis rule for analyzing the control logic diagram that is a diagram describing control logic of a control target.

The control logic diagram analysis rule is layered and has a relationship in which the control logic diagram analysis rule of an upper layer level includes the control logic diagram analysis rule of a lower layer level.

The control logic diagram analysis rule application unit 19 sequentially applies the control logic diagram analysis rule to the control logic diagram from the lower layer level.

Based on an application result of the control logic diagram analysis rule, the control logic diagram template component generation unit 20 acquires the control logic diagram analysis rule having an agreement section within the control logic diagram as the control logic diagram template component.

Based on the application result of the control logic diagram analysis rule, the control logic diagram project-specific part extraction unit 21 extracts an element in the control logic diagram corresponding to the control logic diagram analysis rule having the agreement section within the control logic diagram.

According to such a configuration, even for the control logic diagram with part of the entire control logic diagram different from the control logic diagram analysis rule, by analyzing the control logic diagram using the layered control logic diagram analysis rule, the control logic diagram analysis rule having the agreement section within the control logic diagram can be acquired, and furthermore, an element in the control logic diagram corresponding to the control logic diagram analysis rule having the agreement section within the control logic diagram can be extracted. Therefore, the control logic diagram can be efficiently created by using the control logic diagram analysis rule of the layer level and the element corresponding to the control logic diagram analysis rule.

Also, by separating the control logic diagram into a reusable control logic diagram template component and a project-specific part that is a variable part thereof for use, the project-specific part can be associated with the project information as a parameter candidate to be given to the control logic diagram template component, and reusability of the control logic diagram template component can be increased.

Note that configurations other than these configurations can be omitted as appropriate, but even when at least one another configuration illustrated in this specification is added as appropriate, the effects can be produced.

Also, according to the embodiments, the control logic diagram template component generation unit 20 included in the acquisition unit 120 acquires the control logic diagram analysis rule of the top layer level having the agreement section within the control logic diagram.

According to such a configuration, out of the control logic diagram analysis rule having the agreement section, the control logic diagram analysis rule with the widest agreement range can be acquired as the control logic diagram template component, and thus reusability of the control logic diagram template component can be increased.

Also, according to the embodiments, the control logic diagram project-specific part extraction unit 21 included in the extraction unit 121 extracts an element in the control logic diagram corresponding to the control logic diagram analysis rule of each layer level having the agreement section within the control logic diagram.

According to such a configuration, the project-specific part as a parameter candidate to be given to the control logic diagram template component can be extracted in each layer level, and thus for a case where every control logic diagram template component is used, the corresponding project-specific part can be prepared.

Also, according to the embodiments, the control logic diagram analysis device includes the control logic diagram template component application unit 200 included in the creation unit that creates the control logic diagram, based on the control logic diagram analysis rule acquired by the control logic diagram template component generation unit 20 and an element in the control logic diagram extracted by the control logic diagram project-specific part extraction unit 21.

According to such a configuration, even for the control logic diagram with part of the entire control logic diagram different from the control logic diagram analysis rule, the control logic diagram can be created efficiently within a range having the agreement section by using the control logic diagram analysis rule of the layer level and the element corresponding to the control logic diagram analysis rule.

Also, according to the embodiments, the control logic diagram template component application unit 200 combines the control logic diagram analysis rule and the element in the control logic diagram to create the control logic diagram based on an identifier identifying a target of which control logic is described in the control logic diagram.

According to such a configuration, the control logic diagram template component and the project-specific part corresponding thereto can be retrieved based on the project information, and thus the control logic diagram can be created efficiently.

Also, according to the embodiments, in a control logic diagram analysis method, a control logic diagram analysis rule that is an analysis rule for analyzing a control logic diagram that is a diagram describing control logic of a control target is sequentially applied to the control logic diagram.

Here, the control logic diagram analysis rule is layered and has a relationship in which the control logic diagram analysis rule of an upper layer level includes the control logic diagram analysis rule of a lower layer level.

Then, in sequential application of the control logic diagram analysis rule to the control logic diagram, the control logic diagram analysis rule is sequentially applied to the control logic diagram from the lower layer level.

Then, based on an application result of the control logic diagram analysis rule, the control logic diagram analysis rule having the agreement section within the control logic diagram is acquired.

Then, based on the application result of the control logic diagram analysis rule, the element in the control logic diagram corresponding to the control logic diagram analysis rule having the agreement section within the control logic diagram is extracted.

According to such a configuration, even for the control logic diagram with part of the entire control logic diagram different from the control logic diagram analysis rule, by analyzing the control logic diagram using the layered control logic diagram analysis rule, the control logic diagram analysis rule having the agreement section within the control logic diagram can be acquired, and furthermore, the element in the control logic diagram corresponding to the control logic diagram analysis rule having the agreement section within the control logic diagram can be extracted. Therefore, the control logic diagram can be efficiently created by using the control logic diagram analysis rule of the layer level and the element corresponding to the control logic diagram analysis rule.

<Variation>

Although the embodiments have also described a size, a shape, a relative arrangement relationship of each component, or conditions of implementation and the like in some cases, these are in all aspects illustrative, and are not limited to those described in this specification. Therefore, countless unillustrated variations are assumed within the scope of the present technology. For example, a case where at least one component is modified, a case where added, or a case where omitted, and furthermore, a case where at least one component in at least one embodiment is extracted and combined with a component of another embodiment are included.

Also, as long as no contradictions arise, "one or more" components described as "one" component provided in the embodiments may be provided. Furthermore, each component is a conceptual unit, and includes a case where one component includes a plurality of structures, a case where one component corresponds to part of a certain structure, and furthermore, a case where one structure is provided with a plurality of components. Also, as long as an identical function is performed, a structure having another structure or shape is included in each component.

Also, descriptions in the present specification are referenced for all objects of the present technology, and none is thought to be conventional technology.

Functions by each component described in the embodiments can be performed by at least one processing circuit or electric circuit. The processing circuit and the electric circuit each include a programmed arithmetic processing device, and in that case, by the processing circuit or the electric circuit operating according to the preset program, the functions by each component described in the embodiments are implemented. Also, the program that implements the functions by each component is stored, for example, in a memory (storage medium) including a hard disk, a random access memory, a read only memory, and the like. Also, the processing circuit includes an integrated circuit (application specific integrated circuit, that is, ASIC) or a conventional circuit element that is modified so as to implement the functions described in the embodiments, and the like. Also, the processing circuit and the electric circuit include a hardware circuit, and in that case, by a signal being processed by the processing circuit or the electric circuit, the functions by each component described in the embodiments are implemented.

Also, each component described in the embodiments is assumed as software, and as hardware corresponding thereto, and in a concept of both of software and hardware, each component is referred to as "unit", "processing circuit", or the like.

The present technology may be a case where each component is provided in a plurality of devices in a distributed manner (that is, aspect like a system).

REFERENCE SIGNS LIST

1: PC
2: CPU
3: storage device
4: input device
5: output device
10: control logic diagram analysis device
11: control logic diagram input unit
12: control logic diagram normalization unit
13: facility information input unit
14: facility information storage unit
15: control logic diagram analysis rule input unit
16: control logic diagram analysis rule storage unit
17: control logic diagram analysis rule layering unit
18: control logic diagram analysis rule extraction unit
19: control logic diagram analysis rule application unit
20: control logic diagram template component generation unit
21: control logic diagram project-specific part extraction unit
22: control logic diagram template component storage unit
23: control logic diagram project-specific part storage unit
24: project information input unit
25: project information storage unit
50: facility
51: processing
52: connection line
53: OR operator
54: AND operator
55: NOT operator
56: junction
57: control logic diagram information
70: descriptor
80: process component
81: AND operator component
82: NOT operator component
83: OR operator component
100: notation level
101: Basic processing component level
102: Basic processing level
103: facility configuration level
119: application unit
120: acquisition unit
121: extraction unit
200: control logic diagram template component application unit
201: control logic diagram

The invention claimed is:

1. A control logic diagram analysis device comprising:
a processor to execute a program; and
a memory to store the program which, when executed by the processor, causes the processor to perform processes comprising:
sequentially applying an analysis rule for analyzing a control logic diagram that is a diagram describing control logic of a control target to said control logic diagram,
said analysis rule being layered and having a relationship in which said analysis rule of an upper layer level includes said analysis rule of a lower layer level,
sequentially applying said analysis rule to said control logic diagram from the lower layer level,
acquiring said analysis rule having an agreement section within said control logic diagram based on an application result of said analysis rule, and
extracting an element in said control logic diagram corresponding to said analysis rule having the agreement section within said control logic diagram based on the application result of said analysis rule.

2. The control logic diagram analysis device according to claim 1, wherein said program further causes said processor to perform a process of acquiring said analysis rule of a top layer level having the agreement section within said control logic diagram.

3. The control logic diagram analysis device according to claim 1, wherein said program further causes said processor to perform a process of extracting an element in said control logic diagram corresponding to said analysis rule of each layer level having the agreement section within said control logic diagram.

4. The control logic diagram analysis device according to claim 1, wherein said program further causes said processor to perform a process of creating said control logic diagram based on said acquired analysis rule and said extracted element in said control logic diagram.

5. The control logic diagram analysis device according to claim 4, wherein said program further causes said processor to perform a process of combining said analysis rule and said extracted element in said control logic diagram to create said control logic diagram based on an identifier identifying said control target of which said control logic is described in said control logic diagram.

6. A control logic diagram analysis method comprising:
sequentially applying an analysis rule for analyzing a control logic diagram that is a diagram describing control logic of a control target to said control logic diagram,
said analysis rule being layered and having a relationship in which said analysis rule of an upper layer level includes said analysis rule of a lower layer level,
the sequentially applying said analysis rule to said control logic diagram including sequentially applying said analysis rule to said control logic diagram from the lower layer level;
acquiring said analysis rule having an agreement section within said control logic diagram based on an application result of said analysis rule; and
extracting an element in said control logic diagram corresponding to said analysis rule having the agreement section within said control logic diagram based on the application result of said analysis rule.

* * * * *